United States Patent [19]

Conrad

[11] Patent Number: 5,106,589
[45] Date of Patent: Apr. 21, 1992

[54] METHOD OF CONTROLLING OZONE GENERATOR

[76] Inventor: Richard H. Conrad, 950 Idylberry Rd., San Rafael, Calif. 94903

[21] Appl. No.: 626,185

[22] Filed: Dec. 11, 1990

[51] Int. Cl.$^5$ .............................................. B01J 19/08
[52] U.S. Cl. ........................................... 422/186.15
[58] Field of Search ....................... 422/186.07, 186.15, 422/186.27, 186.28

[56] References Cited

U.S. PATENT DOCUMENTS 3,899,684 8/1975 Tenney ........................ 422/186.11
4,138,724 2/1979 Kawauchi ............................ 364/500

*Primary Examiner*—Brooks H. Hunt
*Assistant Examiner*—Daniel J. Jenkins
*Attorney, Agent, or Firm*—Larry D. Johnson

[57] ABSTRACT

A method of controlling the power used and the ozone generated by an ozone generator. The rate of gas flow through the generator (and/or also the temperature or pressure) is used to either adjust or to limit the output of the power supply. A control signal derived from the gas flow rate is fed to the power supply, influencing its output and thereby affecting the power drawn by the ozone generator. This method enables the concentration or the total quantity of the ozone generated to remain relatively constant with varying gas flow rate, or it can continuously regulate the power level so as to automatically generate the highest possible ozone concentration at any flow rate. In addition, this method allows a single power supply and ozone generator to feed ozone to multiple users with different and/or varying demands, while holding the ozone concentration constant as the users go on and off independently of each other.

21 Claims, 6 Drawing Sheets

METHOD OF CONTROLLING OZONE GENERATOR

BACKGROUND OF THE INVENTION

1. Field of the Invention

This invention relates generally to ozone generators, and more specifically to an improved method for controlling the output of such ozone generators.

2. Description of the Prior Art

Ozone is a very powerful gaseous reactant, and its use has been well established for many years in a wide range of industrial applications. Recently its value in all types of water purification applications has been coming to the fore because of its ability to act as a powerful oxidant, microflocculant and disinfectant without producing toxic by-products. Various means have been used to generate ozone, including AC or DC high-voltage corona discharge, UV light, and microwaves. All of these ozone generators produce ozone "on the spot" (ozone is generally not stored) from a flow of either air or oxygen feed gas, and they all utilize a power supply to provide electrical power. Any variation in gas flow, temperature, or pressure affects the concentration and quantity of ozone produced, and yet the maintenance of a constant ozone output is highly desirable. The rate of gas flow and the temperature (and in negative pressure applications, the pressure) are variables which are difficult and expensive to stabilize.

In the prior art a constant ozone output has been accomplished by feedback control to the power supply (to adjust power level) either from a monitor of gaseous ozone in the gas line downstream from the ozone generator, or from a monitor of dissolved ozone in the water into which the ozone has been injected. Such ozone monitors cost in excess of $5,000, and their feedback control loops can have time lag and oscillation problems. In addition, if a low ozone output were due to a high temperature, the feedback response of raising power input would increase the temperature even further, making things worse. Another possible control method would be feedback of a signal from a gas flow sensor to an automatic regulating valve to maintain a constant gas flow, but automatic regulating valves are prohibitively expensive for most applications, and cannot protect the ozone generator in case of abnormally low flows.

The most practical and widely used method of generating ozone is a high voltage AC corona discharge, where dry air or oxygen flows through a narrow gap or annulus bordered on one side by a metal electrode and on the other by a dielectric electrode surfaced with an electrical conductor. An alternating current of high voltage is connected across the electrodes, producing a high voltage field across the gap which results in the corona discharge. This discharge, which is also known as a "silent discharge" or "cold plasma discharge", converts a percentage of the gas to ozone. The high voltage necessary to drive the corona discharge is produced by a power supply which includes a transformer capable of boosting low voltage AC to a high voltage, usually between 5 and 25 kilovolts. The amount of power drawn from the power supply by the ozone generator is a function of the voltage, the frequency or pulse repetition rate, the gas flow rate, the temperature, and the pressure. The gas flow rate, temperature, and pressure also affect the efficiency of ozone production. The maximum amount of ozone that can be generated depends, in addition to the above factors, on corona cell geometry, the properties of the dielectric used, and the efficiency of cooling. At least two factors limit the highest ozone concentrations efficiently attainable: at higher temperatures the rate of ozone destruction increases; and at higher concentrations the rate of ozone formation decreases, not only becoming self-limiting, with the limit being lowered by higher temperatures, but also, under conditions of low gas flow and high electrical current rather suddenly reaching a point of over-ionization and ozone destruction.

It is desirable to generate as high a concentration of ozone as is efficiently possible because ozone has a rather low solubility in water, and because low ozone concentrations require the use of more dry air or oxygen feed gas and have more off-gassing problems than high concentrations. The generation of high concentrations requires a relatively low gas flow, more power usage per gram generated, and results in fewer grams/hour than the generation of lower concentrations, which uses a higher gas flow, more (but not commensurately more) power to the ozone generator, less power usage/gram (i.e., higher efficiency), and results in considerably larger total quantity (grams/unit time) of ozone.

Furthermore, it would be very desirable to be able to employ a single ozone generator for a variety of different uses or users simultaneously, each user requiring or drawing a different gas flow and going on and off independently of each other, such as in a private installation with a swimming pool and a spa, or in a commercial health club with a swimming pool, a spa, and a baby pool. Known multiple use installations presently utilize a separate high voltage transformer and ozone generator for each end user.

For reliable and long-lived operation of corona discharge-type ozone generators, a means should be provided to insure that over-ionization of the corona cannot occur. Over-ionization results when the ratio of power drawn by the corona to gas flow rate through the corona (power/flow rate) rises above a certain critical threshold ratio. This critical ratio falls (the less forgiving direction) as the temperature of the corona cell increases. Thus either a rise in ambient temperature or a drop in gas flow could cause this threshold to be crossed. Reducing the gas flow decreases the ability of the flow to cool the corona, thereby allowing the temperature to increase, and the slower flow also allows over-ionization to begin to occur because of the longer residence time of the ions in the corona cell. Over-ionization itself causes the temperature to rise because it causes the corona to draw more current from the power supply. Both of these temperature factors lower the critical threshold ratio, resulting in a vicious cycle which creates a condition of sudden overheating, a precipitous drop in ozone output, and a conversion of the corona from many tiny microdischarges to larger and hotter discharges which cause "hot-spot" erosion of metal electrodes and contribute to the dielectric breakdown of dielectric electrodes. Over-ionization also produces a very high level of electromagnetic radiation which wreaks havoc with the power supply and its controls.

Known prior art systems have dealt with the over-ionization problem by shutting down the power supply completely if the gas flow drops below a fixed set-point. In the prior art it has been necessary to select the value of this set-point to be above the critical value at which over-ionization of the corona would begin to occur under worst case conditions of temperature and pressure, with the ozone generator running at its fixed power level. In addition, a margin of safety must be included when choosing the fixed power level in order to take into consideration other worst case conditions including flow rate reducing factors such as gas filters which become clogged between servicings, a water filter whose back-pressure affects the suction of a venturi and is in need of back-washing, and the line voltage to the pump dropping as low as it typically fluctuates. The use of a fixed power level selected for worst case conditions means that some sacrifice in ozone concentration or efficiency is being made whenever better conditions exist, which is most of the time. Furthermore, when operating at a low ambient temperature, the flow rate at which over-ionization of the corona occurs is far less than it is at high ambient temperature, and thus, since gas flow sensing in prior art has been limited to a go/no-go signal which disables the power supply if the gas flow rate falls below the fixed set-point value, many of the shutdowns which would occur due to dips in the gas flow rate are not really necessary. Also, a go/no-go control does not work in multiple use situations, where it would be desirable to keep the ozone generator functioning efficiently over a wide range of gas flows, and yet be protected from over-ionization.

Therefore in most ozone applications it would be of great benefit to have an inexpensive method for automatically maintaining a constant ozone output (either concentration: percent ozone, %; or quantity: grams of ozone/hour, which is equal to the product of concentration and gas flow rate) which is generally independent of variations in the flow rate of the air or oxygen feed gas (and in some cases also independent of variations in temperature and or pressure. Furthermore, in multiple-use installations it would be extremely desirable to provide a means of automatically varying the power fed to the ozone generator so as to maintain a constant ozone output (concentration or quantity) independent of changes in flow rate due to different user systems going on and off. It would also be advantageous to be able to automatically provide, for each flow rate, the optimum power level for either maximum ozone concentration or maximum ozone generation efficiency (weight of ozone generated per Kilowatts used), or any compromise between these parameters.

Ozone generators can be operated at either positive or negative pressure. Either the feed gas source or the end usage of the ozone flow can cause variations in the flow rate. The flow resistance of feed gas preparation filters increases slowly with time as the filter pores fill up. In water purification applications, typical end use means of injecting ozone into water include venturis, static mixers, spargers, and turbines, all of which can and do vary in the amount of flow they either pull or allow, depending on the line voltage to a pump driving a venturi or to a turbine injector, the cleanliness of in-line water filters, the water levels and other back-pressure parameters. It is both difficult and expensive to use an automatic water control system to maintain a constant gas flow under all conditions. Although the gas flow rate itself might be held constant with a motorized regulating valve controlled by a signal from a flow rate sensor, this mechanical solution is prone to breakdown and would be prohibitively expensive for most applications. Particularly, the preferred installation utilizes a venturi and a negative pressure, which would require any such valve to be placed downstream of the ozone generator in order to avoid creating an excessively negative pressure within the generator itself, and thus the valve would have to be ozone-proof, which requires costly materials. Furthermore, in multiple-use installations, the control of gas flow would require separate ozone-proof gas flow sensors and ozone-proof automatic continuously adjustable valves for each user system branch. This would be extremely expensive and complex, and would not be able to vary the power to the ozone generator to maintain, for example, a constant ozone concentration if any of the component systems were to go off.

The purpose of the present invention is to provide a practical, inexpensive and automatic method of compensating for changes in gas flow and optionally also in temperature or pressure by controlling the power used by an ozone generator so that power corresponds to gas flow (and optionally temperature or pressure) so as to:

1) produce the maximum possible ozone concentration for each flow rate, or to maintain either a constant concentration or constant quantity of ozone output;

2) provide for independent multiple user operation; and 3) prevent over-ionization without necessitating shutdown.

SUMMARY OF THE INVENTION

The present invention provides a control method for enhancing ozone generator performance which automatically adjusts power to the generator in order to compensate for changes in feed gas flow and/or in temperature or pressure. The method includes the control of power, drawn from one or more power supplies by one or more ozone generators, by a signal from a gas flow sensor and optionally also by a signal from a temperature or pressure sensor. These signals are used to control the frequency, voltage, current and/or any other power supply factor in such a way as to compensate the ozone output to maintain, regardless of changes in gas flow rate (and/or temperature or pressure, and over a certain applicable range), any of the following parameters:

1) the maximum concentration (%) of ozone possible at each existing combination of sensed variables (gas flow and/or temperature or pressure);

2) a generally constant concentration (%) of ozone;

3) a generally constant quantity (grams/hour) of ozone;

4) any other proportionality desired.

The term "generally" constant is used because in addition to flow rate, temperature, and pressure, there may exist other variables which affect ozone output, including for example, the composition of the gas and the cleanliness of the ozone cell. Thus, instead of having to control flow rate, temperature, or pressure, or to use feedback from an expensive ozone monitor, the method of the present invention provides control of ozone output by compensating for changes in the major variables which would otherwise affect the output.

Alternatively, the method may be used to provide a gas-flow-rate-controlled and/or temperature or pressure-controlled variable power level ceiling for use together with any underlying additional control means such as an ozone monitor in the gas flow or water stream, an ORP sensor in the water stream, a manual power level control, or an automatic switching between a plurality of pre-set power levels. This variable power level ceiling can be based on any of the above parameters, to result in a maximum available power level which is continuously and automatically adjusted by the gas flow rate and/or temperature or pressure so as to:

1) remain safely below the point of over-ionization;
2) not exceed a preset concentration of ozone;
3) not exceed a preset quantity of ozone; or
4) follow any preprogrammed proportionality desired.

This is an enormous improvement over the go/no-go shutdown of the prior art.

In multiple user systems the method of the present invention can maintain a constant ozone concentration while various users go on and off in any combination. All users remain continuously connected to the same common ozone conduit, and neither automatic valves, ozone-proof sensors or electrical connections between the ozone generator and the users are needed. The only requirement is a single gas flow sensor which provides a control signal to the power supply of the ozone generator.

Gas flow rate can be sensed anywhere in the system. Sensors for measuring air or oxygen flow are readily available, and include mass flow sensors (such as the heated bridge), rotameters or vanes with electrical readout, and differential pressure measurement across an orifice. (The flow rate of the ozonated output gas could alternatively be sensed, but the sensor would then have to be ozone-proof and thus far more expensive.) The sensing of and/or the response to the flow rate signal can either be a continuous function, or a step function which utilizes set-points. The flow rate signal can be either directly or inversely proportional to the flow, and either a linear or non-linear function of the flow. A microprocessor or other circuitry may be used to compensate for any non-linearities in the flow signal, in the response of the power supply to the flow signal, and/or in the response of ozone output to the electrical output of the power supply, and can be programmed to provide the proportionality necessary to maintain a constant concentration or quantity of ozone, etc., as desired. This method thereby enables an ozone generation system to automatically compensate for changes in the gas flow rate in a selective or programmable manner. This can provide either the maximum concentration of ozone possible at each gas flow rate, the maximum efficiency of ozone generation for each flow, a concentration of ozone which is relatively constant over a certain range of variation in gas flow, or a total quantity of ozone which is largely independent of changes in gas flow rate over a certain range. To maintain a constant concentration, the flow rate signal would be used to increase the power drawn by the ozone generator in a manner directly (though not necessarily linearly) proportional to an increase in flow rate. To maintain constant quantity, the flow rate signal would be used to decrease the power drawn by the ozone generator as the flow rate increases.

This control method further automatically provides that over-ionization cannot occur, no matter how low the flow rate may fall. The method of the present invention can either be used alone as the sole automatic control, or in single user systems it can be employed together with prior art control means, where the present invention can provide a variable upper limit or ceiling on the power supply output, with the power level below this point continuing to be controlled by any underlying control means such as an ozone monitor, a manual power level control, or switching between a plurality of pre-set power levels. This "floating" ceiling on maximum output sets an upper power limit appropriate to the gas flow at that instant, allowing systems to remain functional under conditions which, with the fixed set-point of the prior art, they would have shut down. Thus this method allows ozone installations to be more flexible, forgiving and reliable.

This invention can also utilize a signal derived from temperature to arrive at the appropriate power level. This would allow safe operation of the ozone generator closer to the critical ratio where higher ozone concentrations are produced, and would provide a more stable ozone output. Temperature sensing could be used either alone or together with flow rate sensing. The temperature sensed could be either the temperature inside the ozone generator cabinet, the temperature of the feed gas or ozone flow, the temperature of a coolant, or the temperature of the ozone generating cell itself. In addition, just as utilizing the gas flow rate to control power provides a built-in safety which never allows more power than appropriate for the gas flow rate, utilizing temperature (or temperature and flow rate) to control power provides a built-in safety which never allows more power than appropriate for the temperature (or for the combination of flow rate and temperature existing at the moment). This prevents the possibility of overheating, in case of, for example, a decrease in coolant fluid flow.

Furthermore, this invention can utilize a signal derived from the pressure of the gas in addition to (or instead of) using the signal derived from flow rate and/or temperature to arrive at the appropriate power level. This would be of particular benefit in generators operating at negative pressure, where the pressure is difficult to regulate and is affected by a number of variables. A more constant ozone output would be achieved.

An example of means of implementation of the present invention would be to use signal(s) from gas flow, temperature, and/or pressure sensors, optionally combined and/or modified in a microprocessor to have the appropriate proportionality, to provide or to affect the voltage reference level input to an error amplifier which governs either the output frequency or the output frequency ceiling of the power supply. This could enable an ozone generator to run continuously at the maximum possible output commensurate with existing conditions, without requiring attention when these conditions change.

The method of the present invention allows a single common source of ozone to feed multiple users, either separately or in any combination, each in accord with the amount of gas which that user draws or allows, with the concentration of ozone remaining generally constant independent of which users are active and, within limits, independent of how much ozone each utilizes. This prevents an overdose of ozone from occurring when only a few users are on, and prevents an underdose when they are all on, without requiring the separate generators, high voltage transformers, controls, or valving of the prior art. A single large generator operates far more efficiently at half output (partly because it runs cooler) than a half-size generator operating at full output. Thus it is better to operate a larger generator alternately at full and at half power, than to have two one-half size generators with one of them switching on and off periodically. Furthermore, one large ozone generator is considerably less expensive, takes up less space (space is usually limited in swimming pool equipment rooms), and is easier to install than several smaller generators of the same total ozone generating capacity. In addition, a single feed gas supply can now be conveniently used, since the use of a single ozone generator avoids cross-control problems that can occur when two generators utilize one feed gas supply. The method of this invention has a very fast response time, and since it does not employ a feedback type of control (with the exception of certain types of temperature sensing), it is stable, free of oscillation problems, and is easy to implement and to adjust.

An important extra benefit of the present invention for both single and multiple user applications is that manual turndown or adjustment of ozone output is achievable simply by intentionally decreasing the gas flow rate. For example, a manual adjustment may be made to a gas metering valve, or to a valve in a water line which bypasses a venturi. No manual adjustment of the power supply is necessary, which simplifies the panel controls and user interface. The great value of using a manual gas flow control valve to reduce ozone quantity while the ozone concentration is maintained at a constant value by the method of the present invention, is that unnecessary usage of desiccant or oxygen is automatically prevented. In contrast, to achieve turndown in the prior art, a manual adjustment of power supply voltage or frequency is necessary, and if it is desired to maintain a constant concentration of ozone while decreasing the quantity, the operator also must manually decrease the gas flow commensurately.

Thus the method of the present invention is simple, trouble-free, and inexpensive, and makes the entire ozone generating system more forgiving of operating conditions and of neglect or error by personnel. It may be used with any type of ozone generator, including corona discharge, UV, microwave, etc. It is especially valuable in small installations where output control is desired, and yet cost and complexity must be kept to a minimum.

DETAILED DESCRIPTION OF A PREFERRED EMBODIMENT

Figure 1:
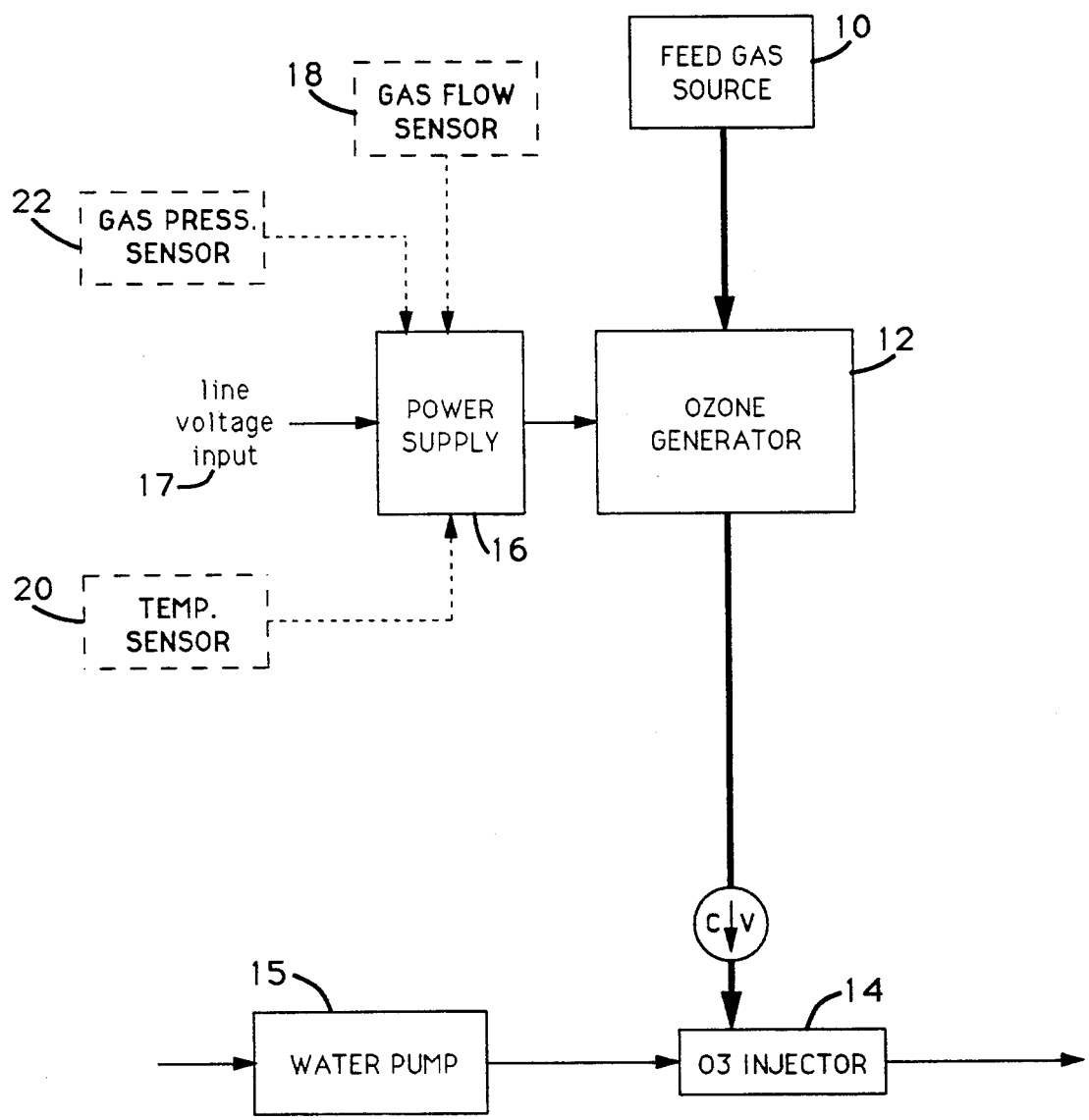
FIG. 1 is a schematic view of the method of the present invention being employed with a single user (negative or positive pressure), depicting the electrical power and control paths and the gas flow paths.

FIG. 1 is an illustration of the method of the present invention being employed with a single user (negative or positive pressure). Feed gas source 10 delivers air or oxygen to ozone generator 12, which then delivers ozone to ozone injector 14, downstream of water pump 15. Power supply 16, energized by line voltage input 17, provides electrical power to ozone generator 12. In the present invention, gas flow sensor 18 senses flow rate through the ozone generator 12, and delivers a flow rate derived control signal to power supply 16. Alternatively or additionally, temperature sensor 20 may be utilized to deliver a temperature derived control signal to power supply 16. As a further alternative, pressure sensor 22 may be utilized to deliver a pressure derived control signal to power supply 16.

Figure 2:
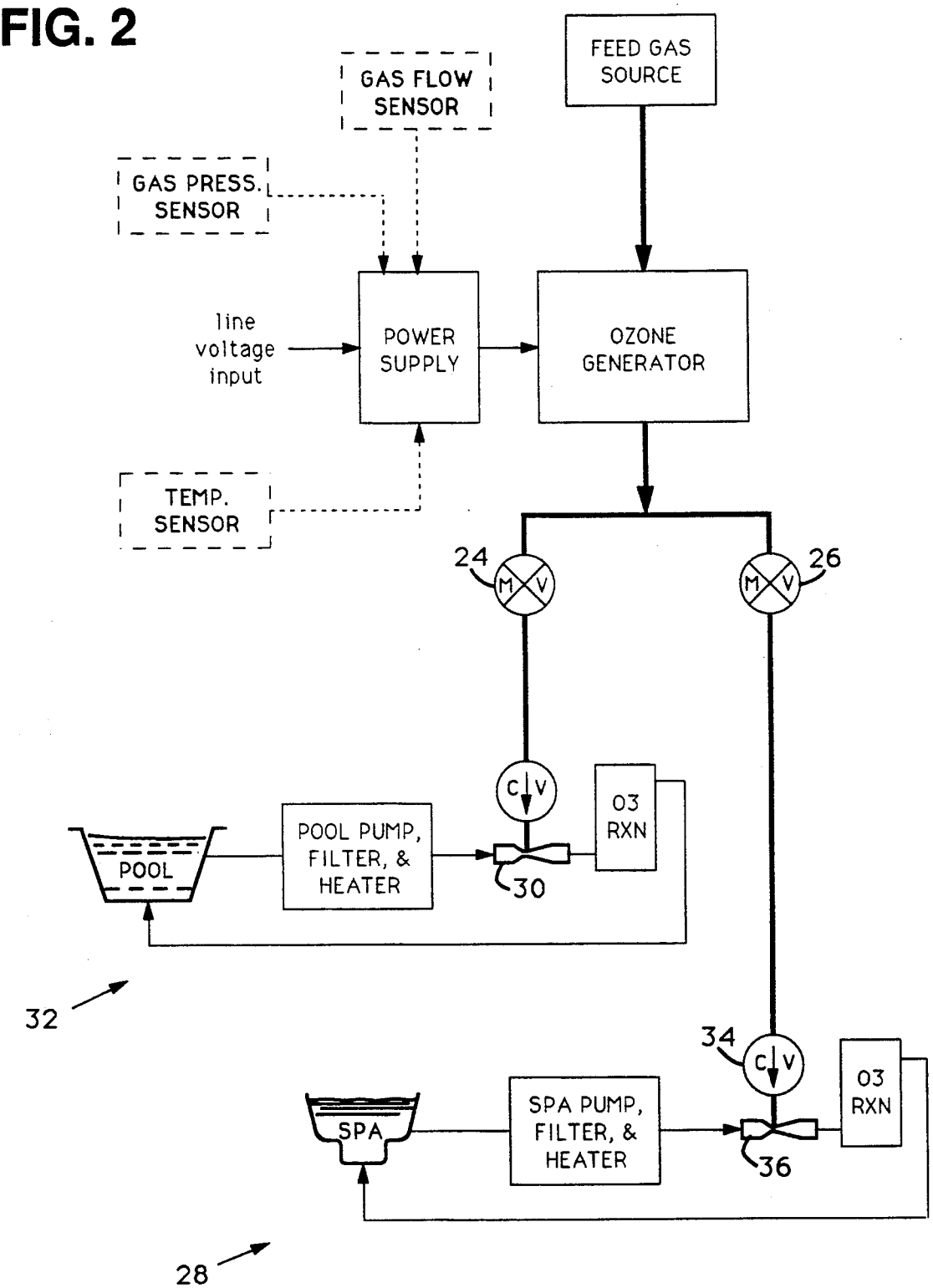
FIG. 2 is a schematic view of the method of the present invention being employed in a negative pressure system having multiple users, depicting the electrical power and control paths and the gas flow paths.

FIG. 2 is an illustration of the method of the present invention being employed in a negative pressure system having multiple users, depicting the electrical power and control paths, and the gas flow paths. Metering valves 24, 26 enable separate flow adjustment for each user. If the users have the ability to go on and off independently, each user branch must include at least one check valve to prevent backwards suction of water from an inactive venturi into an active branch. When one branch or system is off, for example, the spa system 28, the venturi 30 of the pool system 32 cannot aspirate spa water because of the check valve 34 above the spa's venturi 36.

Figure 3:
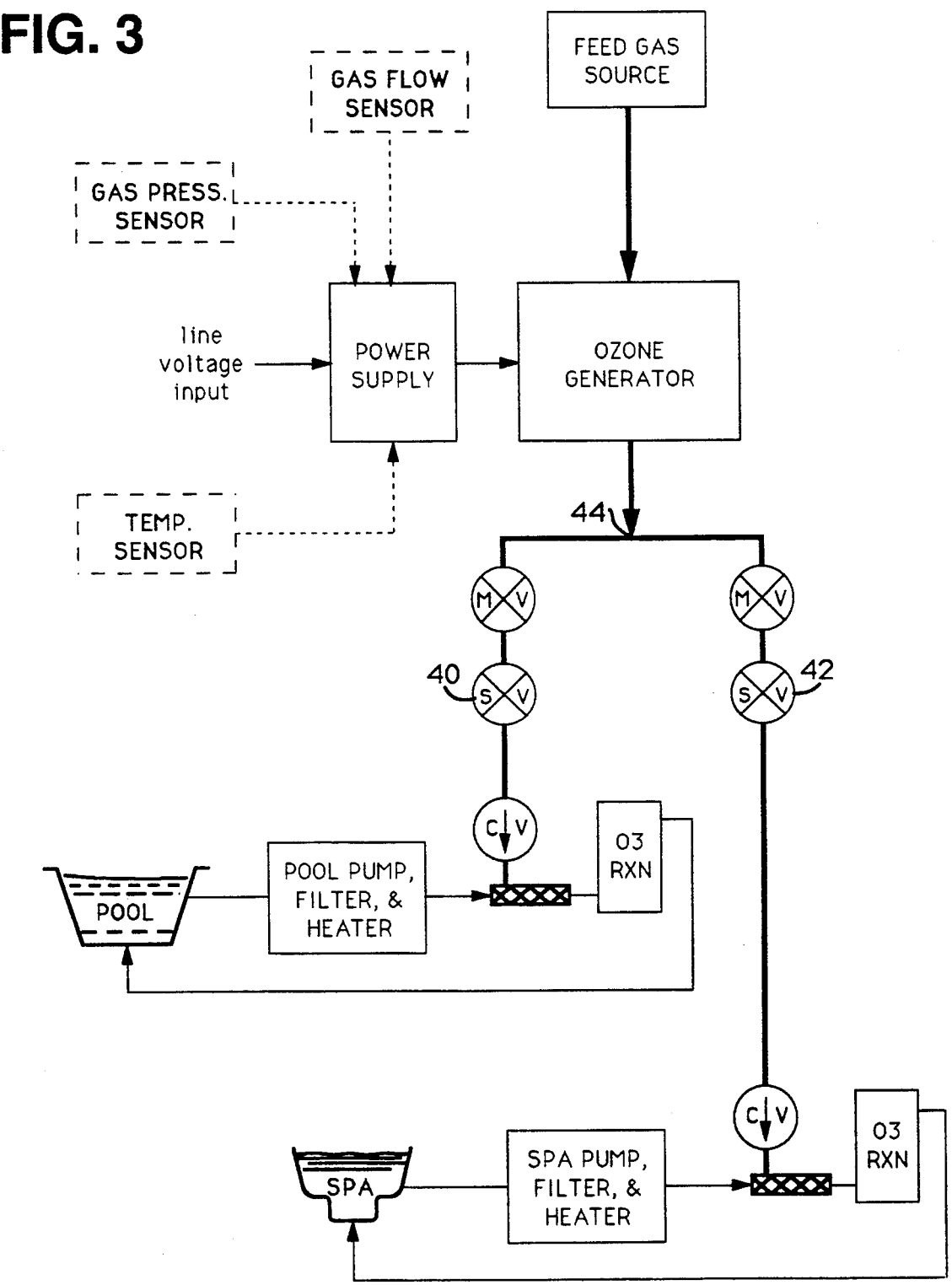
FIG. 3 is a schematic view of the method of the present invention being employed in a positive pressure system having multiple users, depicting the electrical power and control paths and the gas flow paths.

FIG. 3 is an illustration of the method of the present invention being employed in a positive pressure system having multiple users, depicting the electrical power and control paths, and the gas flow paths. Here the pressure of the gas is greater than the pressure of the water downstream from the pump, and the solenoid (or hydraulically operated) valves 40, 42 (or a single three-way valve at the branch point 44) can be employed to prevent ozone from being injected into a user system whose water pump is off.

In both FIG. 2 and FIG. 3, although preferably each user branch includes a manual metering valve, if all of the users are identical no metering valves are necessary downstream of the ozone generator. If the users are not identical, at least N-1 (where N=the number of users) metering valves will be necessary to achieve independent initial flow and flow ratio adjustment. In all of the figures, the valves on each branch can be in any sequence, although the illustrated sequence is preferred. If all gas lines, passages and orifices upstream of the common ozone conduit and branch point are large enough to have a flow resistance which is small compared to that of the metering valve orifices, then there will be little effect of one branch going on or off on the gas flow rate in the other branch(es). Thus, since the control method of the present invention can provide for a generally constant concentration of ozone at the branch point, each branch, when on, will receive a constant concentration of ozone. Since turning off one of the branches reduces the total gas flow through the ozone generator by, for example, ½, this would have caused prior art generators to shut down. In the present invention, the decrease in flow rate simply causes the power drawn by the ozone generator to be automatically decreased commensurately, so as to maintain the same ozone concentration as before.

Figure 4A:
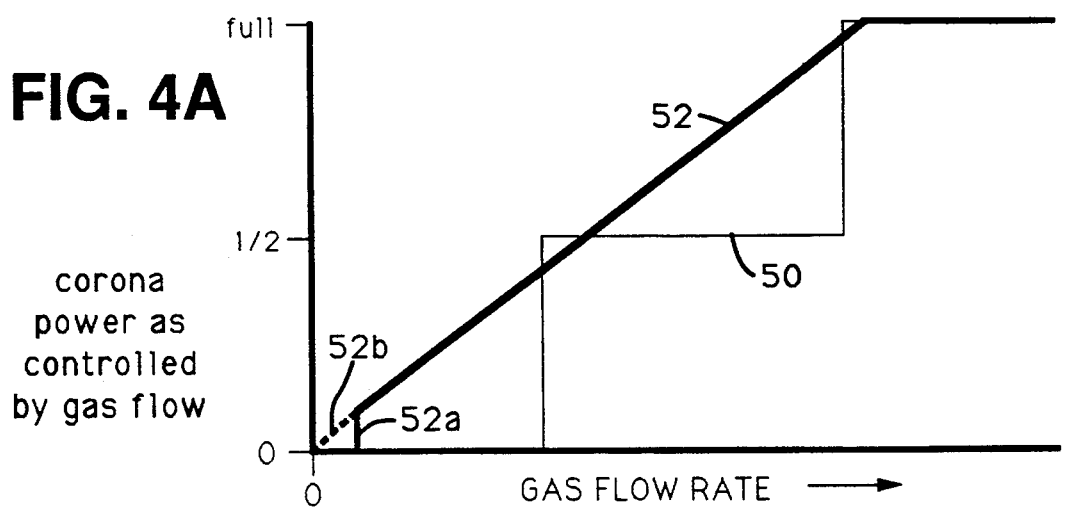
FIG. 4a is a graph of power level versus gas flow rate, with curves depicting power output or power ceilings as controlled by the gas flow rate, with one curve showing stepwise control and the other showing power output optimized for maximum ozone concentration.

FIG. 4a is a graph of power level versus gas flow rate, with curves depicting power output or power ceilings as controlled by the gas flow rate, with curve 50 showing stepwise control of corona power and curve 52 showing corona power as optimized for maximum ozone concentration at each flow rate. Thus this figure illustrates corona power (or corona power ceiling for underlying control by an ozone monitor or other means) as controlled by a signal derived from gas flow. The short vertical segment 52a of curve 52 represents either the lower operating limit of the gas flow sensor, or a pre-set sharp cut-off limit which can be adjustable to the right, or to the left along the dashed diagonal segment 52b of curve 52. Curve 50 depicts stepwise control for two users, where either both users draw the same gas flow, or, if different flows, the second user can go on only while the first user is on. Three control steps would be required in cases where two users drawing different flows can go on and off independently of each other.

Figure 4B:
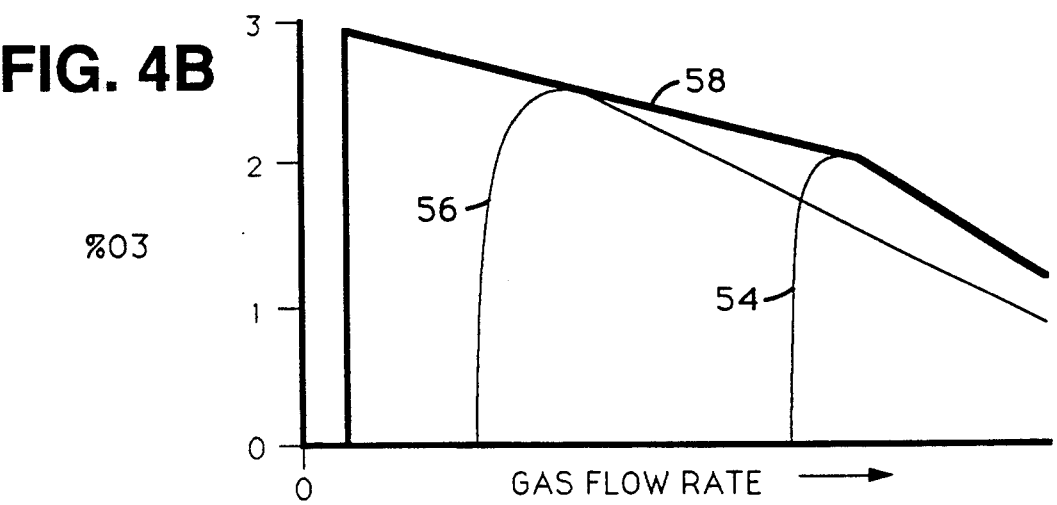
FIG. 4b is a graph of ozone concentration (%) versus gas flow rate for a corona discharge ozone generator, with curves depicting % ozone at full power output, ½ power output, and with power output optimized for maximum ozone concentration via control by the gas flow rate.

FIG. 4b is a graph of ozone concentration (%) versus gas flow rate for a corona discharge ozone generator, with curve 54 depicting % ozone at full power output, curve 56 depicting % ozone at ½ power output, and curve 58 depicting % ozone with power output optimized for maximum ozone concentration at each flow rate via control by the gas flow rate.

Figure 4C:
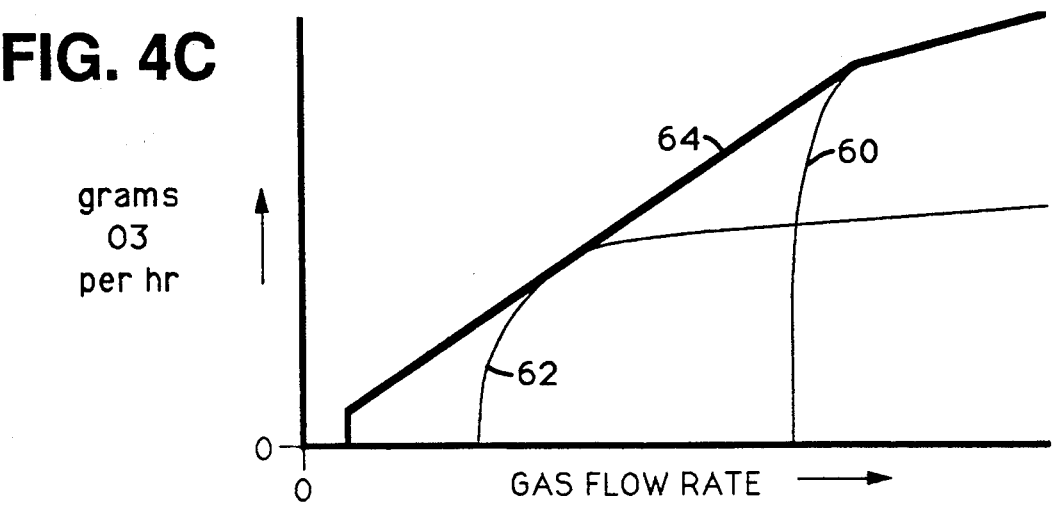
FIG. 4c is a graph of ozone quantity (weight/unit time) versus gas flow rate for a corona discharge ozone generator, with curves depicting ozone quantity at full power output, ½ power output, and with power output optimized for maximum ozone concentration via control by the gas flow rate.

FIG. 4c is a graph of ozone quantity (weight/unit time) versus gas flow rate for a corona discharge ozone generator, with curve 60 depicting ozone quantity at full power output, curve 62 depicting ozone quantity at ½ power output, and curve 64 depicting ozone quantity with power output optimized for maximum ozone concentration via control by the gas flow rate. The near vertical left-hand portions of curves 54, 56, 60, and 62 illustrate the effect of over-ionization on ozone output, with the peaks of curves 54 and 56 demonstrating the close proximity of the maximum attainable ozone concentration to the region of 15 over-ionization. These figures also show how the method of the present invention greatly expands the useful gas flow rate range for operation, as compared to the prior art's sudden cutoff set-point.

Figure 5A:
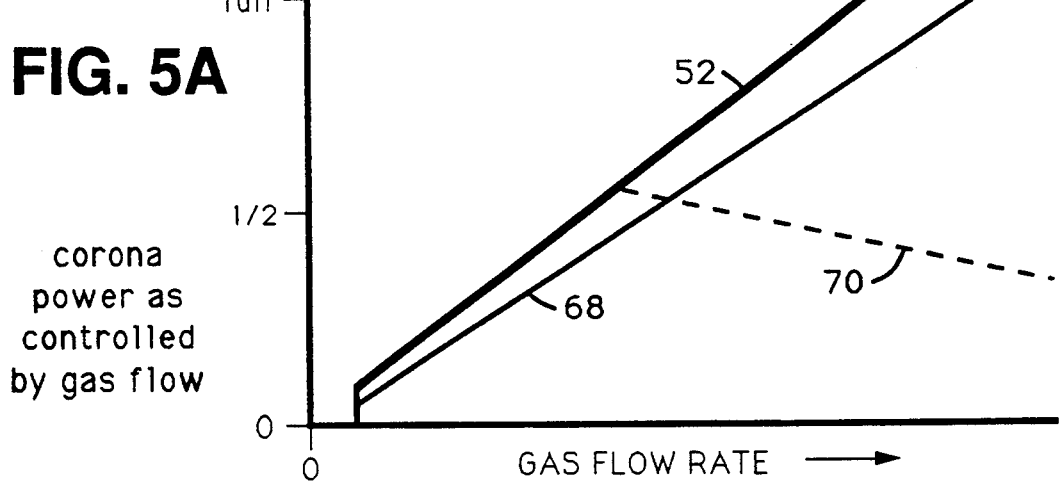
FIG. 5a is a graph of power level versus gas flow rate, with curves depicting power output optimized via control by the gas flow rate for maximum ozone concentration, for constant ozone concentration, and for constant ozone quantity.

FIG. 5a is a graph of power level versus gas flow rate, with curve 52 (from FIG. 4a, for purpose of comparison) depicting corona power optimized via control by the gas flow rate for maximum ozone concentration, curve 68 depicting corona power as controlled by gas flow rate to achieve constant ozone concentration, and curve 70 depicting corona power as controlled for constant ozone quantity.

Figure 5B:
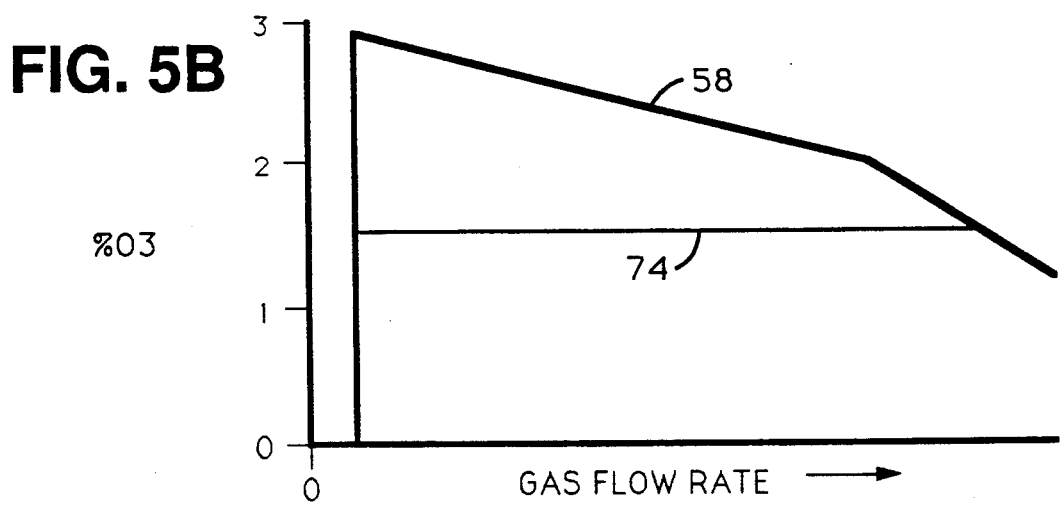
FIG. 5b is a graph of ozone concentration (%) versus gas flow rate for a corona discharge ozone generator, with curves depicting % ozone with power output optimized via control by the gas flow rate for maximum ozone concentration and for constant ozone concentration.

FIG. 5b is a graph of ozone concentration (%) versus gas flow rate for a corona discharge ozone generator, with curve 58 (from FIG. 4b) depicting % ozone with corona power optimized by the gas flow rate for maximum ozone concentration, and curve 74 depicting % ozone with corona power controlled for constant ozone concentration.

Figure 5C:
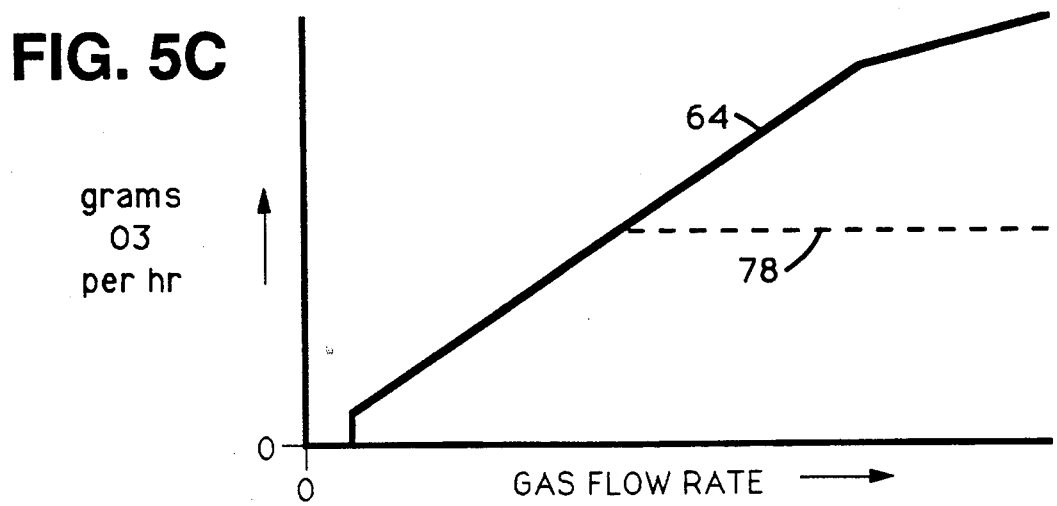
FIG. 5c is a graph of ozone quantity (weight/unit time) versus gas flow rate for a corona discharge ozone generator, with curves depicting ozone quantity with power output optimized via control by the gas flow rate for maximum ozone concentration and for constant ozone quantity.

FIG. 5c is a graph of ozone quantity (weight/unit time) versus gas flow rate for a corona discharge ozone generator, with curve 64 (from FIG. 4c) depicting ozone quantity with corona power optimized by the gas flow rate for maximum ozone concentration, and curve 78 depicting ozone quantity with corona power controlled for constant ozone quantity.

Figure 6:
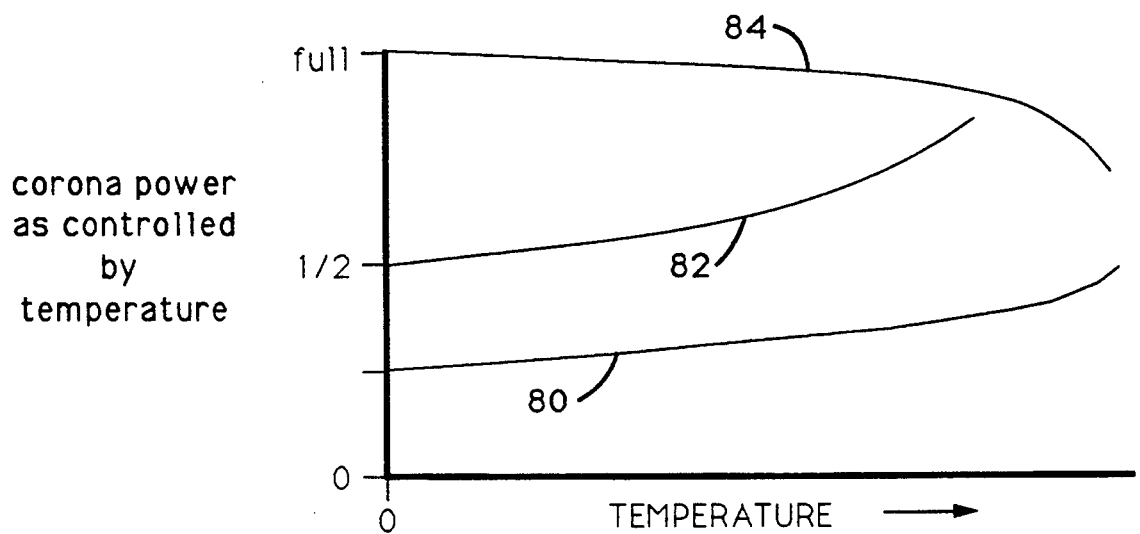
FIG. 6 is a graph of power output as controlled by temperature, versus temperature.

FIG. 6 is a graph of power level as controlled by temperature, drawn as a function of temperature, with gas flow constant. Not shown is the effect of temperature on ozone concentration as generated by corona discharge: at fixed power, as the temperature increases, the ozone concentration decreases. The lower curve 80, which begins at about ¼ of full power, illustrates the method of the present invention controlling power proportionally to temperature in such as way as to result in a constant ozone concentration. For the middle curve 82, which begins at ½ power, the temperature up to which a constant ozone concentration can be maintained is lower because the power increase dictated by the increasing temperature (via the temperature sensor's output signal) in itself causes a further temperature rise. The upper curve 84 shows power levels for the maximum ozone concentration possible at each temperature. Curve 84 can also be used to provide a variable ceiling on the power output range, available, for example, for underlying control by an ozone monitor. The temperature derived control of the power ceiling may be integrated with a gas flow rate derived ceiling control to obtain a variable ceiling which compensates simultaneously for both gas flow rate and temperature.

Figure 7:
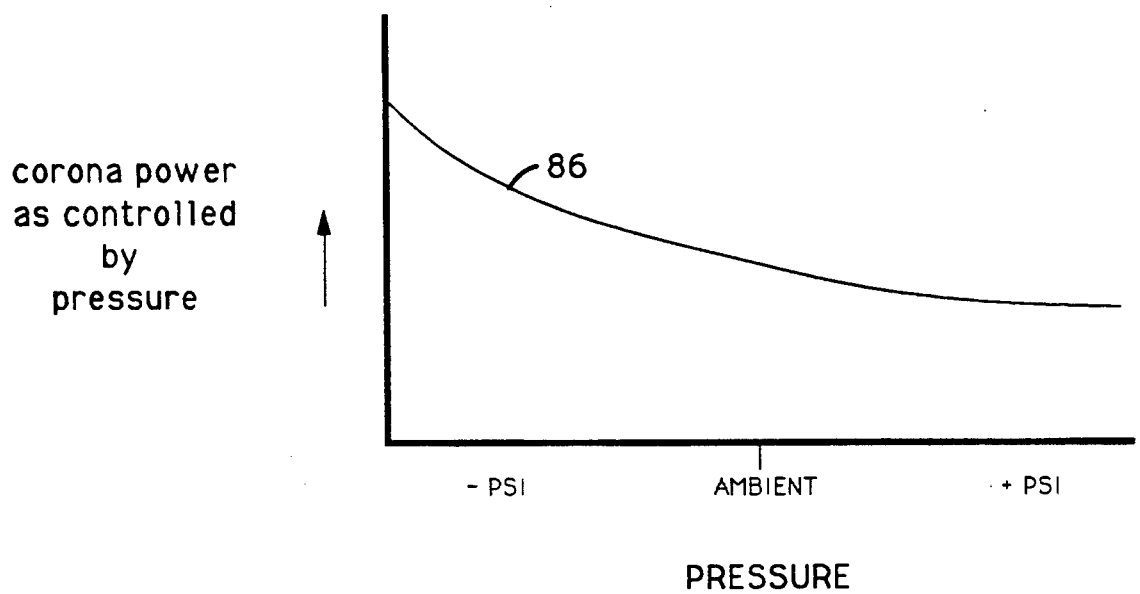
FIG. 7 is a graph of power output as controlled by pressure, versus pressure.

FIG. 7 is a graph of power level as controlled by pressure, versus pressure. Curve 86 generally illustrates corona power as controlled by a signal derived from a pressure sensor so as to maintain an ozone output which is relatively independent of pressure changes. The proportionality between power and pressure, or the slope of curve 86, could alternatively be tailored to maximize ozone output at each pressure or to provide a power ceiling for each pressure, either alone or in participation with signals derived from gas flow rate and/or temperature sensors.

In the method of the present invention, control of corona power may be implemented by signal(s) derived from gas flow, temperature, or pressure, either individually or together in any combination. While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the gas flow rate in said ozone generation system, generating a gas flow rate output signal which is a function of said gas flow rate, delivery of said gas flow rate output signal to said power supply, and controlling said power supply so that said electrical output to said ozone generator is a function of said gas flow rate output signal.

2. The method of claim 1 wherein said gas flow rate is sensed between said feed gas source and said ozone generator.

3. The method of claim 1 wherein said ozone generation system is a negative pressure system.

4. The method of claim 1 wherein said ozone generation system is a positive pressure system.

5. The method of claim 1 wherein said ozone generation system maintains a generally constant concentration of ozone at the ozone generator outlet.

6. The method of claim 1 wherein said ozone generation system maintains a generally constant quantity of ozone at the ozone generator outlet.

7. The method of claim 1 wherein said ozone generation system maintains a maximum concentration of ozone at the ozone generator outlet.

8. The method of claim 1 wherein said variable amplitude of said electrical output to said ozone generator is regulated as a generally smooth function.

9. The method of claim 1, wherein said variable amplitude of said electrical output to said ozone generator is regulated as a multi-amplitude step function.

10. The method of claim 1 wherein said output signal is employed to provide a variable limit on the amplitude of said electrical output to said ozone generator.

11. The method of claim 10 wherein the amplitude of said electrical output to said ozone generator additionally is controlled by any external control means.

12. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the gas pressure in said ozone generation system, generating a gas pressure output signal which is a function of said gas pressure, delivery of said gas pressure output signal to said power supply, and controlling said power supply so that said electrical output to said ozone generator is a function of said gas pressure output signal.

13. The method of claim 12 wherein said gas pressure output signal is employed to provide a variable limit on the amplitude of said electrical output to said ozone generator.

14. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the gas flow rate and temperature in said ozone generation system, generating a gas flow rate output signal which is a function of said gas flow rate, and a temperature output signal which is a function of said temperature, delivery of said gas flow rate output signal and said temperature output signal to said power supply, and controlling said power supply so that said electrical output to said ozone generator is a function of said gas flow rate output signal and said temperature output signal.

15. The method of claim 14 wherein said gas flow rate and/or temperature output signal is employed to provide a variable limit on the amplitude of said electrical output to said ozone generator.

16. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the gas flow rate and gas pressure in said ozone generation system, generating a gas flow rate output signal which is a function of said gas flow rate, and a gas pressure output signal which is a function of said gas pressure, delivery of said gas flow rate output signal and said gas pressure output signal to said power supply, and controlling said power supply so that said electrical output to said ozone generator is a function of said gas flow rate output signal and said gas pressure output signal.

17. The method of claim 16 wherein said gas flow rate and/or gas pressure output signal is employed to provide a variable limit on the amplitude of said electrical output to said ozone generator.

18. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the temperature and gas pressure in said ozone generation system, generating a temperature output signal which is a function of said temperature, and a gas pressure output signal which is a function of said gas pressure, delivery of said temperature output signal and said gas pressure output signal to said power supply, and controlling said power supply so that said electrical output to said ozone generator is a function of said temperature output signal and said gas pressure output signal.

19. The method of claim 18 wherein said temperature and/or gas pressure output signal is employed to provide a variable limit on the amplitude of said electrical output to said ozone generator.

20. A method of controlling the ozone output of an ozone generation system, said ozone generation system including a gas flow path from a feed gas source to an ozone generator to an ozone generator outlet; said ozone generation system further including a power supply providing an electrical output to said ozone generator; said ozone generation system yielding measurable parameters consisting of gas flow rate, temperature, and gas pressure; said method comprising the steps of:

sensing the gas flow rate, temperature and gas pressure in said ozone generation system, generating a gas flow rate output signal which is a function of said gas flow rate, a temperature output signal which is a function of said temperature, and a gas pressure output signal which is a function of said gas pressure, delivery of said gas flow rate output signal, said temperature output signal and said gas pressure output signal to said power supply, and controlling said power supply so that said electrical output to said ozone generator is a function of said gas flow rate output signal, said temperature output signal and said gas pressure output signal.

21. The method of claim 20 wherein said gas flow rate and/or temperature and/or gas pressure output signal is employed to provide a variable limit on the amplitude of said electrical output to said ozone generator.

* * * * *